Figure 1:
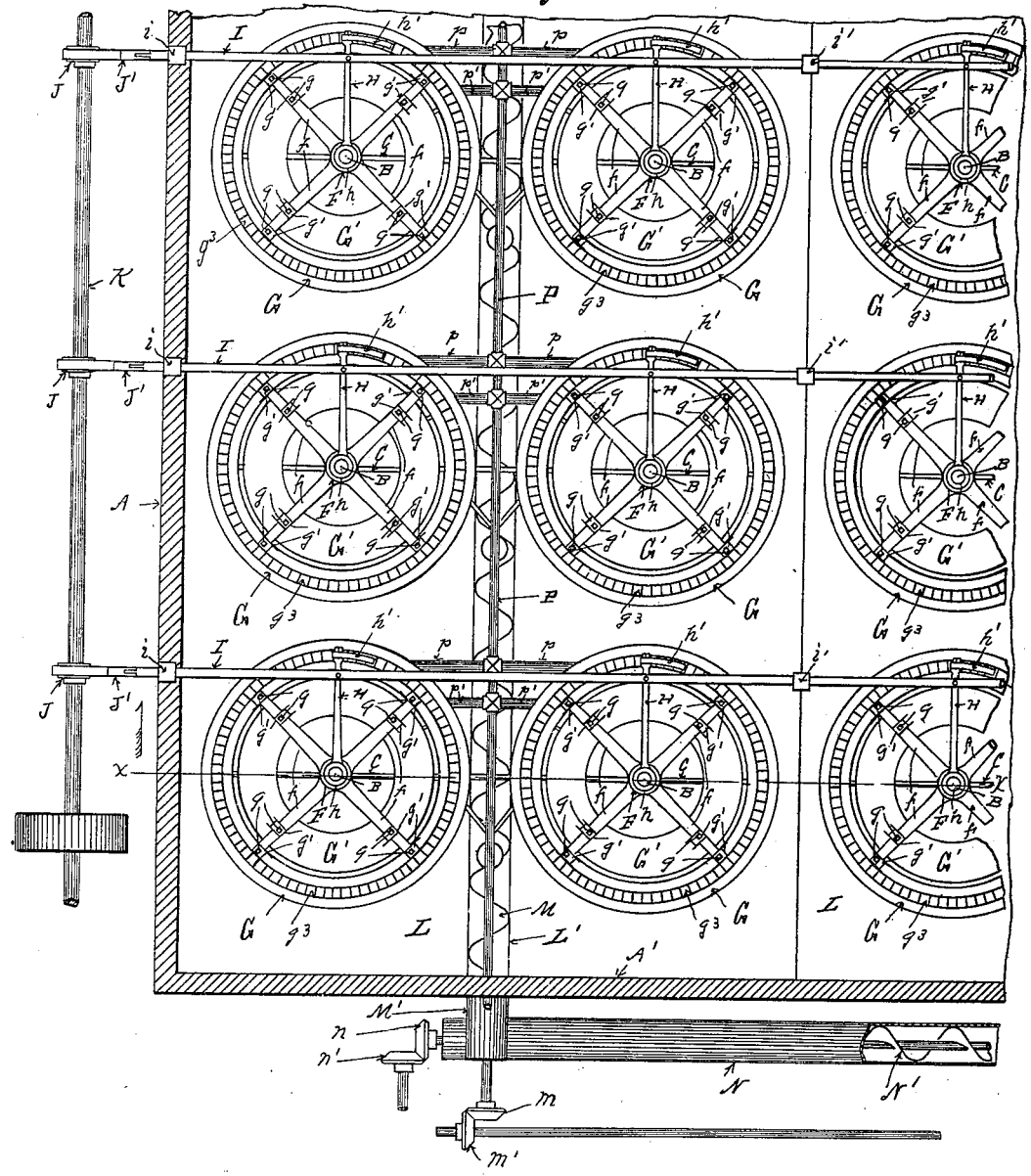

No. 663,395. Patented Dec. 4, 1900.
P. F. REARDON.
APPARATUS FOR MAKING LAMPBLACK.
(Application filed Mar. 24, 1900.)
(No Model.) 2 Sheets—Sheet 1.

WITNESSES
Fred Einfeldt
F. J. Bastett

INVENTOR
Patrick F. Reardon
By Sturgeon
atty.

No. 663,395. Patented Dec. 4, 1900.
P. F. REARDON.
APPARATUS FOR MAKING LAMPBLACK.
(Application filed Mar. 24, 1900.)
(No Model.) 2 Sheets—Sheet 2.
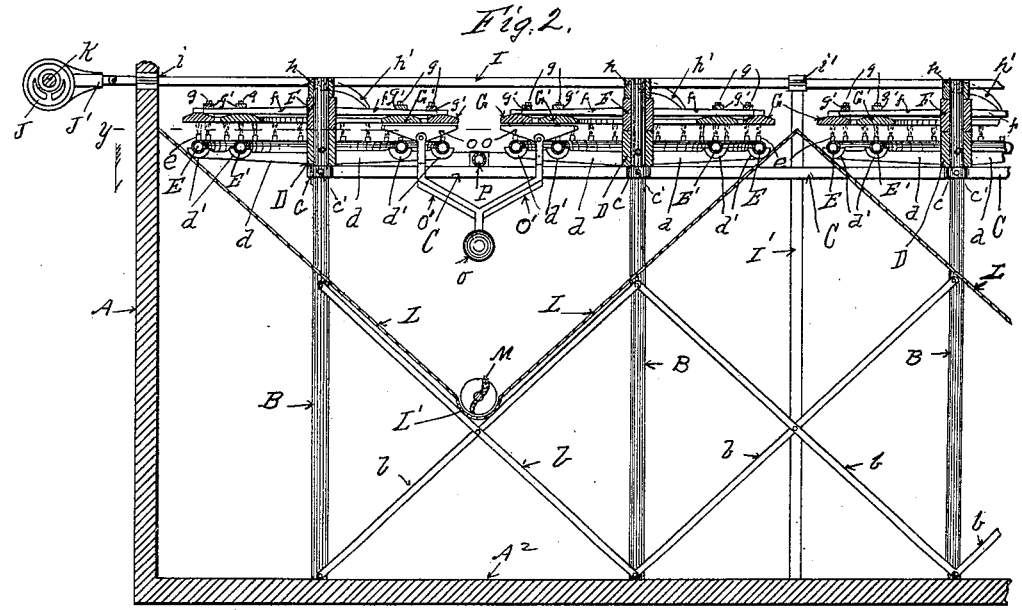
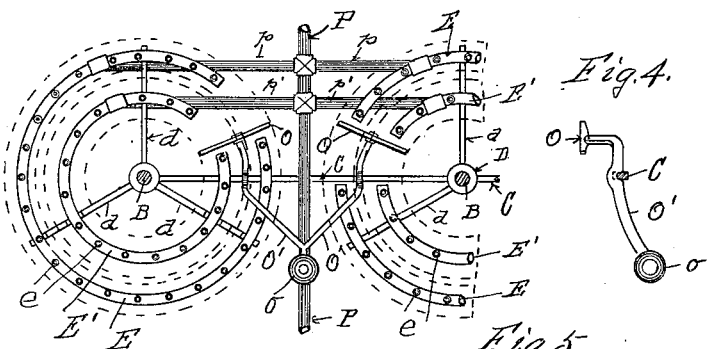
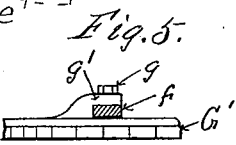
WITNESSES
Fred Einfeldt
F. J. Bassett
INVENTOR
Patrick F. Reardon
By Sturgeon
Atty.

UNITED STATES PATENT OFFICE.

PATRICK F. REARDON, OF KANE, PENNSYLVANIA, ASSIGNOR OF ONE-HALF TO JAMES McDADE, OF SAME PLACE.

APPARATUS FOR MAKING LAMPBLACK.

SPECIFICATION forming part of Letters Patent No. 663,395, dated December 4, 1900.

Application filed March 24, 1900. Serial No. 10,010. (No model.)

*To all whom it may concern:*

Be it known that I, PATRICK F. REARDON, a citizen of the United States, residing at Kane, in the county of McKean and State of Pennsylvania, have invented certain new and useful Improvements in Carbon-Black Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to hydrocarbon-gas-black machines; and it consists substantially in the improvements hereinafter set forth and explained, and illustrated in the accompanying drawings, in which—

Figure 1 is a plan view of a section of my improved hydrocarbon-gas-black machine. Fig. 2 is a vertical section thereof on the line $x\ x$ in Fig. 1. Fig. 3 is a horizontal section on the line $y$ in Fig. 2, showing the arrangement of the burner-pipes and scraper mechanism. Fig. 4 is a side view of the scraper mechanism shown in Fig. 3 looking from the right. Fig. 5 is a detail showing the method of securing the deposit-plates to the arms of their supporting-spiders.

In the manufacture of carbon-black the mechanism ordinarily used consists of a closed building, ordinarily made of sheet-iron, within which either horizontally-rotating or horizontally-reciprocating deposit-plates are installed, under which plates gas-burners are located, so that the flames therefrom impinge against the under surface of the plates and deposit the gas-black thereon, from whence it is removed by means of scrapers and falls into hoppers located under the scrapers, from whence it is removed by means of conveyers inclosed in pipes and conveyed thereby to a suitable storage-receptacle. In the practical operation of this mechanism serious losses occur, for the reason that a large amount of the gas-black escapes from the under surfaces of the deposit-plates, and it is finally deposited upon the under surface of the roof of the building, upon the framework, and upon the posts of the operating mechanism, from whence it finally falls to the ground and becomes a loss. The portion of the black so lost is the most valuable portion of the black produced and is known in the trade as "drop-black," as it is deposited at a much lower temperature than that deposited on the deposit-plates, and any portion of it saved by any means brings double the price of the black taken from the deposit-plates. Again, as the scraper mechanism has heretofore been constructed and operated it frequently scrapes portions of the black from the deposit-plates having fire therein, which falls into the small hoppers now used and is conveyed into the closed conveyer-pipes without the knowledge of the operator, and thereby frequently sets the whole mass of gas-black on fire, destroying large quantities of the black and making it necessary to shut down and stop the entire manufacture until all traces of the fire are removed, thereby causing great loss. To overcome these difficulties, I make the hopper mechanism trough-shaped and of such size that all of the drop-black accumulating on the walls and framework will fall therein and slide down into the semicircular bottoms of these hoppers, in which the conveyers operate, which being open any fire therein can be quickly discovered before it is conveyed into the closed conveyer-pipes and thence into the storehouse. I have also overcome the defects heretofore experienced in the construction and operation of annular deposit-plates arranged in pairs, one within the other, so as to revolve on the same horizontal plane, as I have made the deposit-plates with lugs thereon adapted to engage revoluble spider-arms in such a manner that the expansion and contraction of the plates is provided for, as hereinafter more fully described.

In the drawings thus illustrating my invention A A' are side and end walls, and $A^2$ the floor (the roof and the other walls not being shown) of the building in which the machine operates.

Upon the floor $A^2$, I have posts B, equidistant from each other, which are provided with braces b b to retain them in an upright position. A short distance below the tops of these posts B, I secure transverse horizontal bars C, provided with openings forming collars c, preferably encircling the posts B, to which they are secured by means of pins or bolts c', these bars operating as supports for the mechanism hereinafter described. Upon these collars c I secure the hubs D of spiders having horizontal arms d d d, in the top of which there are depressions d', adapted to receive and support circular gas-pipes E E', provided with burner-nipples e, this feature being clearly illustrated in Fig. 3.

Upon the top of the spider-hubs D there are placed the hubs F of spiders having horizontal arms f, which engage lugs g' g' on the tops of deposit-plates G G', where they are secured by set-screws g. These deposit-plates G and G' consist of rings having their under surfaces flat, the plates G' being within and concentric with the plates G and having their lower faces on the same plane as the lower faces of the plates G. These plates G and G' are also concentric with the burner-pipes E and E', said pipes being under the centers of said plates, as illustrated in Fig. 3. The spider-hubs F rotate freely on the posts B. On the tops of the plates G there are ratchet-teeth $g^3$, and on the tops of the hubs F of the spiders supporting the plates G G', I place the hubs h of arms H, and pivoted on the ends of the arms H are pawls h', adapted to engage the ratchet-teeth $g^3$ on the plates G, and to the arms H are pivoted longitudinal rods I, operating in guides i in the side walls A of the building and i' on standards I'. These rods I are driven by eccentrics J on a shaft K and connecting-rods J', operated thereby, outside of the side wall A of the building, which operate to produce a reciprocal movement of the rods I, which operate the dogs h', so as to rotate the deposit-plates G and G'. Under each two longitudinal rows of the plates G and G' are placed hoppers L, each of which covers the space longitudinally and transversely under two rows of deposit-plates—as, for example, one hopper extends transversely from the side wall A to the standards I' and the next from the said standard I' to the next corresponding standard, and so on to the opposite side wall of the building, as illustrated in Fig. 2. In the bottom of each of the hoppers L there is a longitudinal semicircular groove L', which extends the entire length thereof, and in these semicircular grooves L', I place worms M, which extend out through sleeves M', with bevel-gears m on the shaft thereof, which are driven by bevel-gears m', and below the end of the sleeves M' there is a tube N, into which the under side of the sleeve M' opens, in which there is a worm N', driven by bevel-gears n n', by means of which tube N and the worm N' the carbon-black collected by the worms M from all of the hoppers L is collected and delivered at a common point. To remove the carbon-black from the under surfaces of the deposit-plates G and G', I provide scrapers O O, pivoted on arms O' O', which arms are pivoted on the bars C and joined together and provided with counterweights o, which operate to keep the scrapers O O uniformly in contact with the under surfaces of the deposit-plates G G'.

For supplying gas to the burner-pipes E E', I use longitudinal pipes P, which rest upon the cross-bars C between each pair of deposit-plates G G', and from this pipe P, I run branch pipes p p to the burner-pipes E E, and pipes p' p' to the burner-pipes E' E', as clearly illustrated in Fig. 3.

It will be observed that by my improved construction I have doubled the capacity of the deposit-plates, and I could, if desired, use three deposit-plates on the supporting-spiders instead of two plates, as shown. It will also be observed that the hoppers L are of such shape that the entire floor-surface of the building is covered, the object of this construction being to catch the large amount of carbon-black accumulating on the walls and under side of the roof of the building, which, as carbon-black machines are now constructed, is all wasted.

Having thus described my invention so as to enable others to construct and operate the same, what I claim as new, and desire to secure by Letters Patent of the United States, is—

1. In a carbon-black machine, the combination of a building inclosing a series of revolving deposit-plates, gas-supply pipes, burners, and scraper mechanism under said plates, with longitudinal hoppers having open grooves in the bottoms thereof, and parallel with and joining each other so as to cover the floor-space of the building under said mechanism, and conveyers operating in the open grooves in the hopper-bottoms, substantially as and for the purpose set forth.

2. In a carbon-black machine, the combination of horizontal revolving deposit-plates arranged in two rows and having burner and scraper mechanism thereunder, within an inclosed building, with a hopper extending longitudinally the entire length of the rows of deposit-plates, and laterally the entire width of said two rows of deposit-plates, and having an open groove, longitudinally, in the bottom thereof, and a conveyer operating in the open groove in the bottom of said hopper, substantially as and for the purpose set forth.

3. In a carbon-black machine, comprising substantially a building inclosing a series of revolving horizontal deposit-plates, the combination of a series of annular deposit-plates arranged in pairs on the same horizontal plane, one within the other, revoluble spiders having arms engaging lugs on the tops of said plates for supporting and rotating the same, gas-supply pipes, burners and scraper mechanism under said plates, longitudinal hoppers under said series of deposit-plates, parallel with and joining each other so as to cover the floor of the building, and a conveyer operating in an open longitudinal groove in the bottom of each of said hoppers, substantially as and for the purpose set forth.

In testimony whereof I affix my signature in presence of two witnesses.

PATRICK F. REARDON.

Witnesses:
 FRED EINFELDT,
 F. J. BASSETT.